March 8, 1932.                R. WATSON                1,848,810

AUTOMOBILE CLOCK

Filed Aug. 23, 1927

INVENTOR.

Robert Watson

Patented Mar. 8, 1932

1,848,810

UNITED STATES PATENT OFFICE

ROBERT WATSON, OF WASHINGTON, DISTRICT OF COLUMBIA

AUTOMOBILE CLOCK

Application filed August 23, 1927. Serial No. 214,926.

This invention relates to clocks adapted particularly for use on automobiles, to indicate either standard time or the running time of a vehicle, as desired. In carrying out the invention, I provide a clock, either stem-wound or electrically wound, having a magnet which, in the first instance, controls the operation of the clock by means of a brake applied to the balance wheel, or, in the second instance, controls its operation by supplying energy to wind the clock. In both cases, I provide means for controlling the circuit of the magnet through some medium which must be operated in starting and stopping the vehicle, and in the present case I have shown a key switch which controls the ignition circuit of the motor as this medium.

Where the clock is one which is manually wound, and a brake is employed to stop the clock, the brake normally tends to engage the balance wheel, but it may be locked out of engagement with the wheel to permit the clock to run continuously and keep standard time. A device is arranged upon the clock casing for manually moving the brake out of engagement with the balance wheel and, at the same time, interrupting the circuit of the magnet so that no current can flow through the magnet coil while the clock is keeping standard time. When this device is moved in the opposite direction it becomes dis-engaged from the brake, and the latter is allowed to engage the balance wheel, and at the same time this device completes the circuit of the magnet so that the latter may control the brake, holding it out of engagement with the balance wheel while the magnet is connected to the battery through the ignition switch and permitting the brake to set when the ignition switch is opened, whereby the clock will operate only while the motor is running.

Where an electrically-wound clock is employed, a manually operable device on the clock connects the winding magnet directly to the battery in one position of said device, and the clock operates continuously; but in another position of said device, the magnet is connected to the battery through the ignition switch and the clock operates only when the latter switch is closed.

In the accompanying drawings.

Figure 1:
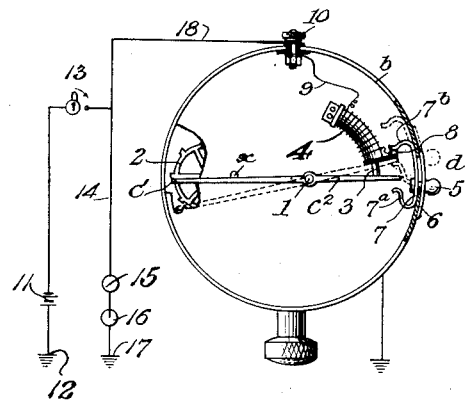
Fig. 1 is a rear elevation of a stem-winding clock, with the back of the casing removed, illustrating my invention.
Figure 2:
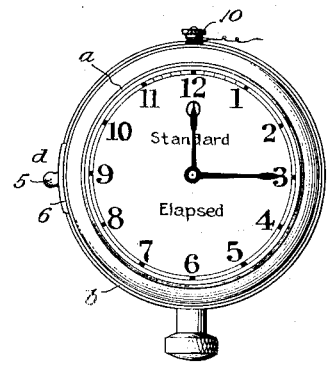
Fig. 2 is a front view of the clock.
Figure 3:
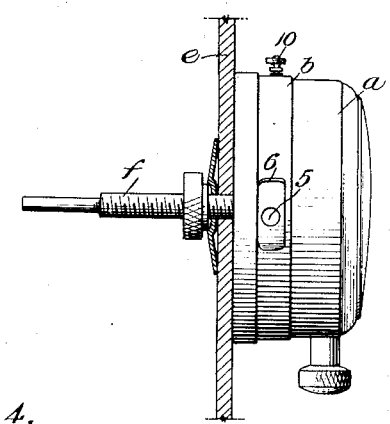
Fig. 3 is a side elevation of the clock, showing it attached to the dashboard of an automobile.

Referring to Figs. 1, 2 and 3 of the drawings, $a$ represents a casing containing the clock movement, and $b$ represents a casing containing the means for controlling the operation of the movement. In these views, a brake lever $c$ is pivoted at 1 to the casing $b$, and one end $c'$ of the lever is bent at a right angle and extends into the casing $a$ and is adapted to engage the balance wheel 2 of the clock. A small solenoid core 3 is secured to the opposite end $c^2$ of the brake lever and extends within a solenoid coil 4. The weight of the solenoid core normally tends to hold the brake lever in engagement with the balance wheel, preventing the operation of the clock. When the solenoid is energized, its core rocks the brake lever away from the balance wheel, as indicated in dotted lines in Fig. 1, permitting the clock to operate.

A slide $d$ is arranged on the side of the casing $b$, this slide comprising a pin 5, which extends through a slot in the side of the casing and through an external metal strip 6 and an internal metal strip 7. The pin, which serves as a handle by which the slide may be moved, connects these strips so that they will slide together circumferentially of the casing, in frictional engagement therewith. The function of the strip 6 is to cover the slot and prevent dust from getting into the casing. The strip 7 has a part $7^a$ at its lower end which extends under the end $c^2$ of the brake lever, and a part $7^b$ at its upper end which projects over a contact piece 8. When the slide is in the lower position shown in full lines in the drawings, the part $7^b$ engages the contact and the part 7ª is below and out of engagement with the lever, the latter engaging the balance wheel and resting against the stop $x$. When the slide is moved to the dotted line position, the part 7ª engages the lever and moves it away from the balance wheel, and the clock will then operate as long as the lever is in this position. This movement also breaks the electrical connection between the part 7ᵇ of the slide and the stationary contact 8. The contact 8, which is insulated from the casing, is one terminal of the coil of solenoid 4. The other terminal is shown connected by wire 9 to a binding post 10, arranged on the side of the casing $b$ and insulated therefrom. When the slide is in its lower position and engaging the terminal contact 8, the latter contact will be grounded on the casing through the slide. When the clock is on a metal dashboard $e$, the casing of the clock is grounded thereon by an attaching screw $f$, which extends through the dashboard and supports the clock; or the casing may otherwise be grounded on the frame of the vehicle.

The circuit of the solenoid extends through a switch which is necessarily operated in stopping or starting of the vehicle or motor. In the present instance, the circuit is through a switch which controls the ignition circuit of the motor and which must be turned in one direction to start the motor and in the opposite direction to stop it. The battery of the ignition circuit is indicated at 11, one side of the battery being grounded on the frame of the vehicle in the usual manner, as indicated at 12. The key-controlled switch, for opening and closing the ignition circuit, is shown at 13. From this switch the ignition circuit extends through conductor 14, coil 15, and circuit-breaker and distributor 16 to ground at 17. A branch 18 leads from the conductor 14 to the binding post 10 on the clock.

The dial of the clock as shown in Fig. 2, has a zero printed upon it immediately under the figures indicating the hour of twelve, and it is also printed with the word Standard above its center, and the word Elapsed below its center.

The operation is as follows: As long as the slide is in its upper position, no current can flow through the solenoid coil because the circuit of the latter is broken at the contact 8, and the slide will hold the brake lever away from the balance wheel. Hence, the clock will run continuously and may be used to keep standard time by properly setting the hands. When the operator of the vehicle desires to make a trip to a distant point and to have the clock indicate the elapsed or running time consumed on the trip, he moves the slide down and sets the hands to zero. By this movement of the slide, the circuit of the solenoid is closed at the contacts 7ᵇ and 8, and the part 7ª of the solenoid is lowered out of engagement with the brake lever and the brake stops the clock. The operator closes the ignition switch 13 when he desires to start the motor, and opens the switch when he desires to stop the motor. As soon as the switch is closed, the solenoid circuit is completed and the solenoid rocks the brake lever to release the clock mechanism, which continues to operate as long as the motor is in operation. When the ignition switch is opened to stop the motor, the solenoid becomes de-energized, and the brake then rocks into engagement with the balance wheel and stops the clock. The hands will indicate the hours and minutes that the motor runs during the trip, eliminating motor stops, if the hands are set to zero at the commencement of the trip. Upon return from the trip, the slide may be moved upwardly to cause the clock to keep standard time while the vehicle is being used locally.

Figure 4:
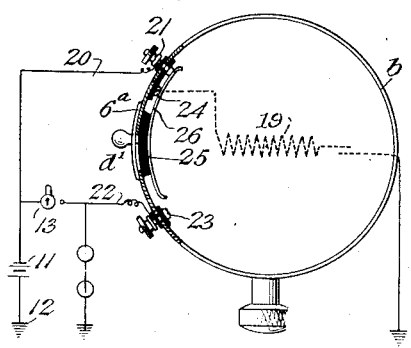
Fig. 4 is a rear view of an electrically-wound clock, having my improvements thereon; and, Fig. 5 is a front view of the same.
Figure 5:
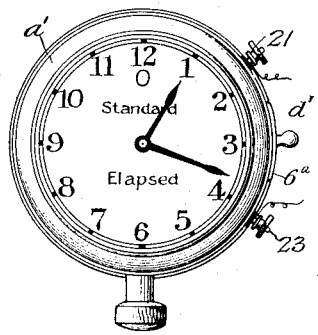

In Figs. 4 and 5, $a'$ represents an electrically wound automobile clock, and $b'$ indicates a casing at the back of the clock, corresponding to the casing $b$ in Fig. 3. In such clocks, a magnet is energized at intervals of a half minute or so, and applies tension to a small main spring, and if the current is cut off from the clock, the latter stops after a few seconds. The magnet for intermittently winding the clock is indicated in dotted lines at 19. Ordinarily, one terminal of this magnet is connected directly to the battery, and the other terminal is grounded on the frame of the automobile. In the present invention, one terminal of the battery is connected by a wire 20 directly to a binding post 21, which is secured to and insulated from the casing $b'$, and a conductor 22 leads from the ignition switch 13 to a binding post 23, which is secured to and insulated from the casing. An insulated contact 24 is arranged adjacent the inner end of the binding post 21. One end of the magnet coil is connected to this contact, as shown. A slide $d'$ is arranged on the side of the casing, this slide comprising an outer metal strip 6ª and an inner block of insulating material 25, and on the inner face of the block is a metal contact strip 26, which projects beyond both ends of the block, as shown. When the slide is in the upper position, the upper end of the strip 26 bridges the contacts 24 and 21 and thus connects the magnet coil directly to the battery so that the clock will function in the ordinary way and keep standard time. When the slide is moved to the lower position, the contact member 26 will be out of engagement with the binding post 21, and will engage the binding post 23 and connect the latter electrically with the contact 24 and the coil of the magnet. As the binding post 23 is connected to the battery only when the ignition switch 13 is closed, it will be seen that in the lowered position of the slide, the winding magnet will receive current only while the ignition switch is closed.

When the operator desires to have the clock shown in Figs. 4 and 5 keep standard time, he moves the slide to its uppermost position and sets the hands for standard time. When he wishes to know his running time on a trip, he lowers the slide and sets the hands to zero. Thereafter, whenever he closes the ignition switch, the clock will start and it will remain running until he opens the switch to stop the motor, when the clock will also stop. Thus, the clock will indicate the running time of the motor, which is practically the running time of the vehicle.

What I claim is:

1. The combination with the ignition circuit of an internal combustion engine and a switch for opening and closing the same, of a clock, a magnet controlling the operation of the clock, a circuit for the magnet adapted to be opened by said switch when the ignition circuit is opened and closed by said switch when the ignition circuit is closed, and a manually operable switch on the clock adapted to open and close said latter circuit.

2. The combination with a clock of a brake normally stopping the clock, a magnet for releasing the brake, a circuit for the magnet, and manually operable means on the clock for opening the circuit of the magnet and for holding the brake in released position.

3. The combination with a clock of a brake normally stopping the clock, a magnet for releasing the brake, a circuit for the magnet, a switch in said circuit, and a manually operable device on the clock adapted, when moved to one position, to open said switch and release the brake, and when moved to another position to close said switch and permit the brake to set.

4. The combination with the ignition circuit of an internal combustion engine and a switch for opening and closing the same, of an electromagnetically wound clock, a circuit leading from a current source directly to the magnet which operates the clock, a circuit leading from said switch to said magnet, and a manually operable switch on the clock for connecting either one of said circuits to the magnet and simultaneously disconnecting the other circuit from the magnet.

In testimony whereof I hereunto affix my signature.

ROBERT WATSON.